(12) United States Patent
Ogawa et al.

(10) Patent No.: US 6,529,610 B1
(45) Date of Patent: Mar. 4, 2003

(54) SPEAKER MOUNTING STRUCTURE

(75) Inventors: Masuo Ogawa, Osaka (JP); Tomokazu Sugamura, Osaka (JP)

(73) Assignee: Funai Electric Co., Ltd., Daito (JP)

( * ) Notice: Subject to any disclaimer, the term of this patent is extended or adjusted under 35 U.S.C. 154(b) by 0 days.

(21) Appl. No.: 09/552,714

(22) Filed: Apr. 19, 2000

(30) Foreign Application Priority Data

Apr. 22, 1999 (JP) ............................................. 11-002716

(51) Int. Cl.⁷ ............................................... H04R 25/00
(52) U.S. Cl. ........................................ 381/388; 381/333
(58) Field of Search .................................. 381/306, 333, 381/334, 388, FOR 146, FOR 148, 87, 332

(56) References Cited

FOREIGN PATENT DOCUMENTS

| JP | 3-83982 | 8/1991 |
|----|---------|--------|
| JP | 5-2485 | 1/1993 |
| JP | 3048394 | 2/1998 |

*Primary Examiner*—Sinh Tran
(74) *Attorney, Agent, or Firm*—Crowell & Moring LLP

(57) ABSTRACT

In the speaker mounting structure, a speaker 2 is mounted onto a cabinet 1 through a speaker holder 5. The speaker holder 5 is divided to a holder main body 55 for holding the speaker 2 thereon and a mounting portion 56, and the mounting portion 56 is screwed to a projecting portion 17 provided on and projected from the cabinet 1. The holder main body 55 extends through a corner portion 16 between the front wall 12 and peripheral wall 14 of the cabinet 1, and the holder main body 55 is disposed so as to face the peripheral wall 14 of the cabinet 1 with a clearance H between them.

4 Claims, 5 Drawing Sheets

SPEAKER MOUNTING STRUCTURE

BACKGROUND OF THE INVENTION

The present invention relates to a speaker mounting structure and, in particular, to a structure for mounting a speaker which is to be mounted on a cabinet of audio-visual equipment through a speaker holder.

As a structure for mounting a speaker to a cabinet of audio-visual equipment such as a television and a television united with a video recorder, there are known a structure in which, as previously proposed by the present applicants in the Japanese Utility Model Application No. Hei 10-5956, a speaker is mounted directly onto the cabinet in a close contact manner, and a structure in which, as previously proposed by the present applicants in the Japanese Utility Model Application No. Hei 10-9716, a speaker is mounted onto the cabinet through a speaker holder.

Of the two above-cited structures, a speaker mounting structure proposed in the Japanese Utility Model Application No. Hei 10-9716 is shown in FIG. 5. In this structure, a mounting portion 51 provided in a speaker holder 5 holding a speaker 2 thereon is fixed to a projecting portion 13 formed on the inner surface of the front wall 12 of a cabinet 1 by a mounting screw 52, the end edge 53 of the speaker holder 5 located on the opposite side of the mounting portion 51 thereof is received by a support piece 15 which is provided on the peripheral wall 14 of the cabinet 1, and the leading end of the front plate 54 of the speaker holder 5 is in contact with the corner portion 16 of the cabinet 1. However, in the speaker mounting structure as disclosed in the Japanese Utility Model Application No. Hei 10-5956, in which a speaker is mounted directly onto the cabinet in a close contact manner, there arises a problem that sounds are liable to be indistinct; and, there is found another problem that sounds coming out of the speaker cause the cabinet to vibrate slightly, which in turn makes the sounds to tremble in a "bzzzt" manner. Also, in the speaker mounting structure as disclosed in the Japanese Utility Model Application No. Hei 10-9716, there is found the same problem that sounds are similarly made to tremble in the "bzzzt" manner.

SUMMARY OF THE INVENTION

The present invention aims at eliminating the above-mentioned drawbacks found in the conventional speaker mounting structures. Accordingly, it is an object of the invention to provide a speaker mounting structure in which the whole of a speaker holder holding a speaker thereon is mounted in such a manner that it floats up from a cabinet, thereby being able not only to prevent sounds from being indistinct to thereby reduce the occurrence of the above-mentioned bzzzt-like trembling sounds to a great extent, but also to enhance the sound quality of sounds in the meddle- and high-tone ranges.

In attaining the above object, according to a first aspect of the invention, there is provided a speaker mounting structure, wherein a speaker holder holding a speaker thereon is fixed to a projecting portion disposed on the above-mentioned cabinet and the whole of the speaker holder is thereby disposed a clearance between the cabinet and itself. In this structure, since the whole of the speaker holder floats up from the cabinet, the sounds are prevented from being indistinct, the occurrence of the trembling sounds can be controlled greatly, and the quality of the sounds especially in the middle- and high-tone ranges can be enhanced.

According to a second aspect of the invention, in a speaker mounting structure as set forth in the first aspect, preferably, the speaker holder may comprise a holder main body for holding the speaker thereon and a mounting portion provided on and projected from a portion of the periphery of the holder main body, the mounting portion may be fixed to the above-mentioned projecting portion of the cabinet, and the holder main body may be disposed so as to extend in a cantilever manner from the above-mentioned fixing portion between the mounting portion of the speaker holder and the projecting portion of the cabinet. According to this structure, since the mounting portion fixed to the projecting portion is acoustically isolated from the holder main body holding the speaker thereon, the occurrence of the trembling sounds can be controlled to a great extent and also the quality of the sounds especially in the middle- and high-tone ranges can be enhanced.

According to a third aspect of the invention, in a speaker mounting structure as set forth in the second aspect, since the mounting portion of the speaker holder is fixed to the projecting portion of the cabinet using a screw, there can be obtained a great mounting strength between them.

According to a fourth aspect of the invention, in a speaker mounting structure as set forth in the second or third aspect, a sound release opening formed in the holder main body is situated in a portion adjacent to the mounting portion of the speaker holder, and the holder main body may include a sound guide space for guiding sounds given from the speaker to the thus formed sound release opening. In this case, a front plate can be disposed in the holder main body so as to face the speaker, and a space inside the front plate can be formed as a sound guide space, whereby the front plate and the mounting portion is separated from each other by the sound release opening. As a result of this, even when the front plate is vibrated by the sounds given from the speaker, the vibration of the front plate is not transmitted to the mounting portion, thereby being able to prevent the above-mentioned trembling sounds.

According to a fifth aspect of the invention, in a speaker mounting structure as set forth in the second or third aspect, the projecting portion maybe disposed on the inner surface of the front wall of the cabinet, and the holder main body may be disposed so as extend through a corner portion between the front wall of the cabinet and the peripheral wall of the cabinet formed continuously with the front wall. In this structure, since the sound release opening in the holder main body is formed so as to face forwardly, sounds can be released in a proper direction, for example, forwardly of a television or a television united with a video recorder. Also, the sound release opening may also be formed so as to face the corner portion. In this case as well, there can also be obtained a similar effect.

DETAILED DESCRIPTION OF THE PREFERRED EMBODIMENTS

Figure 1:
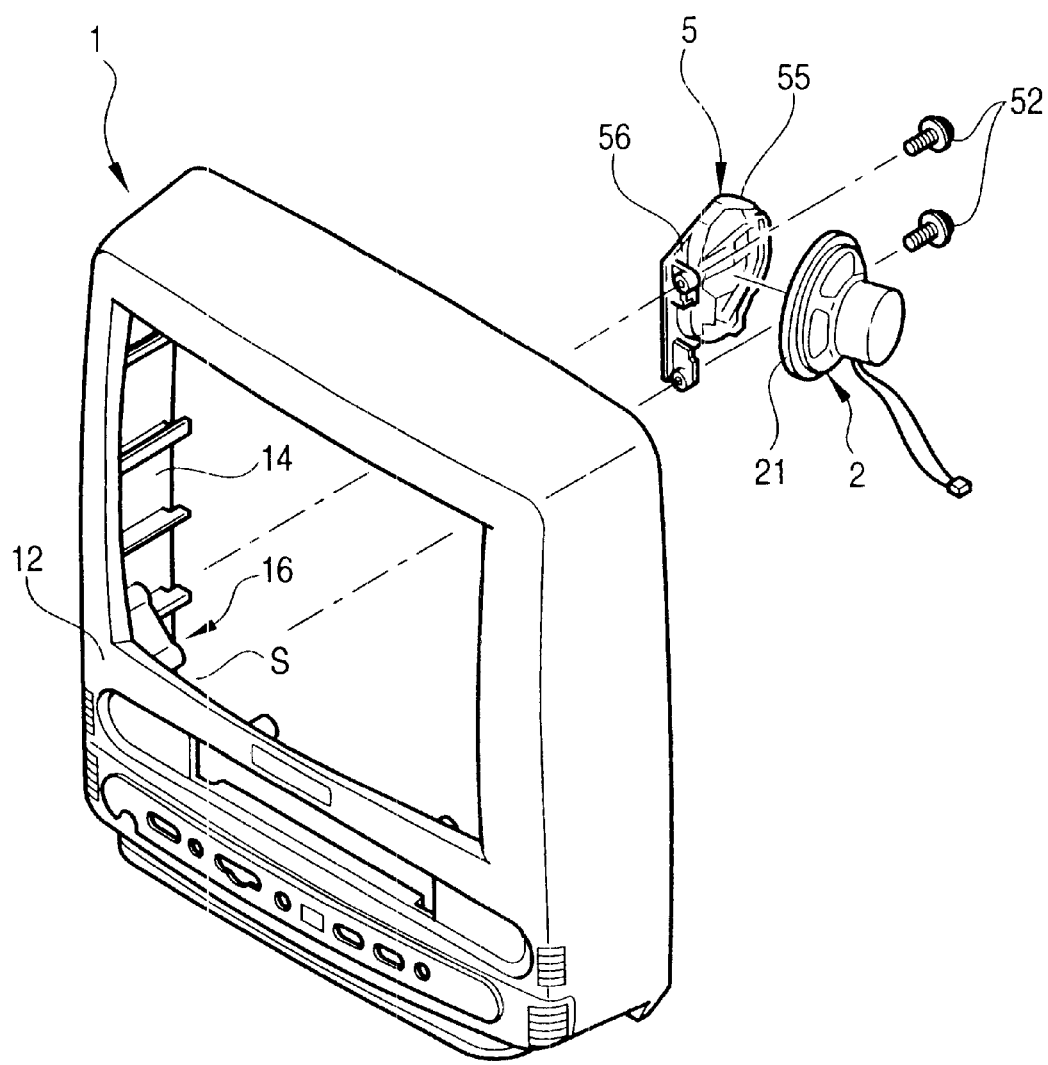
FIG. 1 is an exploded perspective view of a speaker mounting structure according to an embodiment of the invention.
Figure 2:
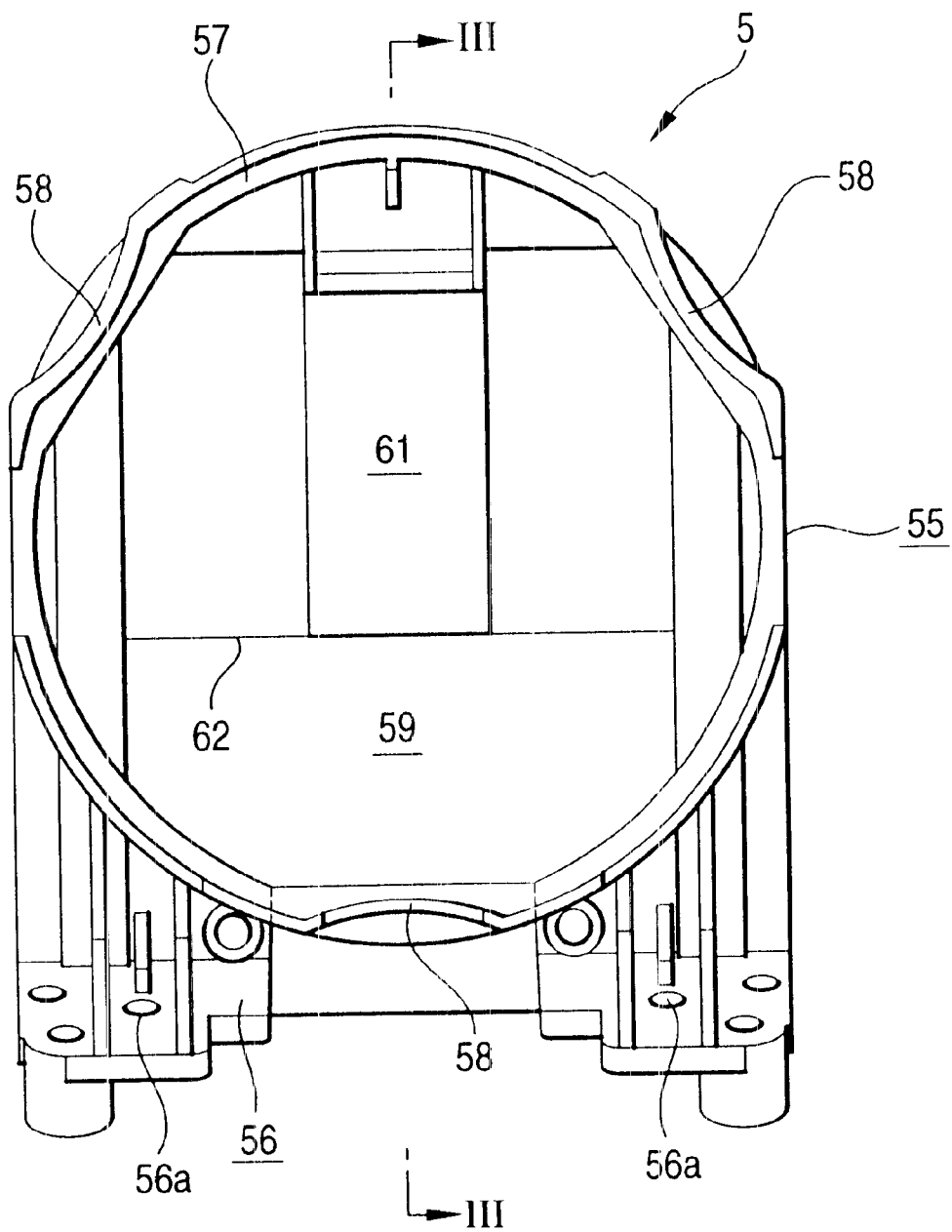
FIG. 2 is a side view of a speaker holder.
Figure 3:
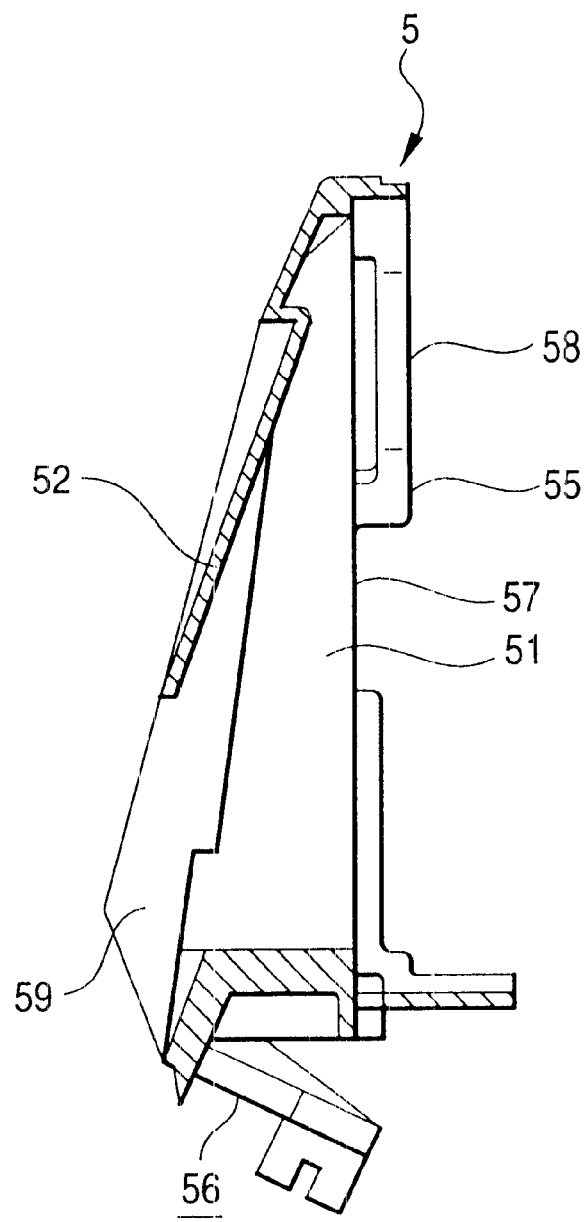
FIG. 3 is a schematic section view taken along the line III—III shown in FIG. 2.
Figure 4:
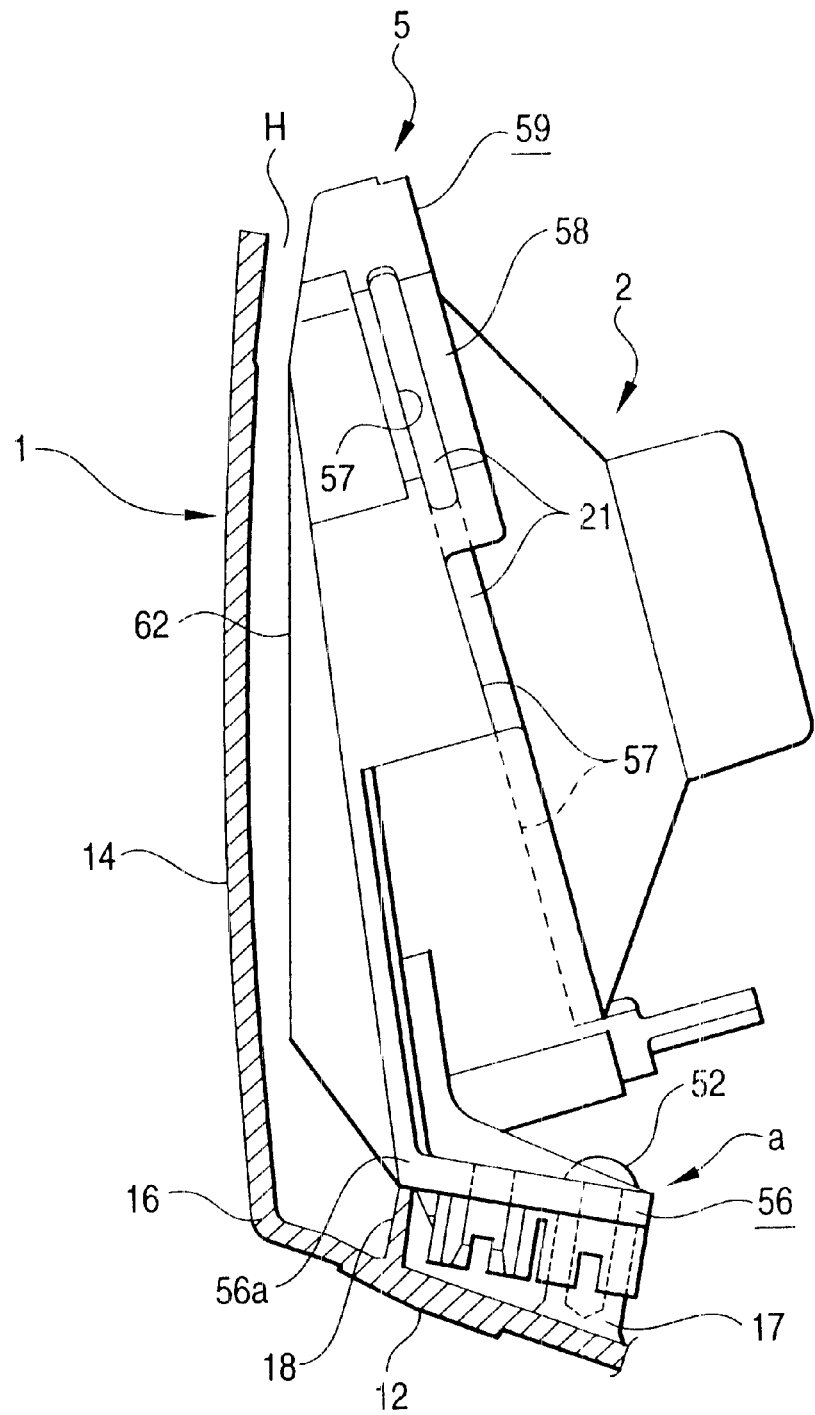
FIG. 4 is a plan view of the present speaker mounting structure, in which only the cabinet is shown in a broken manner; and, FIG. 5 is a plan view of a conventional speaker mounting structure, in which only the cabinet is shown in a broken manner.

Now, FIG. 1 is an exploded perspective view of an embodiment of a mounting structure for mounting a speaker 2 according to the invention, FIG. 2 is a side view of a speaker holder 5, FIG. 3 is a schematic section view taken along the line III—III shown in FIG. 2, and FIG. 4 is a plan view of the mounting structure in which only the cabinet 1 is shown in a broken manner.

The cabinet 1 shown in FIG. 1 is a front cabinet which is provided in the front portion of a television united with a video recorder; and, in the cabinet 1, a speaker mounting space S is secured on the lower side of a corner portion 16 which is defined by the front wall 12 of the cabinet 1 and the peripheral wall 14 of the cabinet 1 formed on the left side thereof.

As shown in FIGS. 2 and 3, the speaker holder 5 comprises a holder main body 55 and a mounting portion 56 provided on and projected from a portion of the periphery of the holder main body 55 in such a manner that it is bent in part thereof; and, in the mounting portion 56, there are formed mounting screw insertion holes 56a. The holder main body 55 comprises: a ring-shaped seat surface 57 to be superimposed by a circular-shaped edge frame portion 21 which, as shown in FIGS. 1 and 4, surrounds the periphery of a vibration plate provided in the speaker 2; a plurality of engagement frame portions 58 for holding and fixing the edge frame portion 21 superimposed on the seat surface 57; a sound release opening 59 formed at a position adjacent to the mounting portion 56; and a sound guide space 61 for guiding sounds given from the speaker 2 to the thus formed sound release opening 59. The sound guide space 61 is formed inside a front plate 62 which is provided on the front side of the holder main body 55 in an inclined manner.

As shown in FIG. 4, the speaker 2 can be held on the holder main body 55 not only by superimposing the edge frame portion 21 onto the seat surface of the holder main body 55 but also by bringing the edge frame portion 21 into engagement with the plurality of engaging frame portions 58. In the speaker holder 5 in which the speaker 2 has been held in this manner, in case where the mounting portion 56 of the speaker holder 5 is fixed to a projecting portion 17, which is provided in the front wall portion 12 of the cabinet 1, at one or more positions thereof using one or more mounting screws 52, the base portion 56a of the mounting portion 56 is received by a support piece 18 which is provided in the cabinet 1. Due to this, the mounting portion 56 of the speaker holder 5 is fixed strongly and stably to the front wall 12 of the cabinet 1 through the projecting portion 17 and support piece 18 of the cabinet 1. On the other hand, the holder main body 55 of the speaker holder 5 projects in a cantilever manner from the above-mentioned fixing portion a between the mounting portion 56 of the speaker holder 5 and the projecting portion 17 of the cabinet 1 through the corner portion 16 of the cabinet 1, and the whole of the holder main body 55 is opposed to the peripheral surface of the cabinet 1 with a clearance between them. Therefore, the whole of the holder main body 55 floats completely upwardly of the cabinet 1, that is, it is held at a position distant by a clearance H from the cabinet 1. Also, since the projecting portion 17 and support piece 18 are interposed between the mounting portion 56 and the front wall 12 of the cabinet 1, the mounting portion 56 also floats upwardly of the cabinet 1 to a position with a certain clearance between them. Further, the sound release opening 59 (see FIG. 3) of the speaker holder 5 is formed so as to face the corner portion 16 of the cabinet 1.

According to the above described mounting structure, the occurrence of the trembling sounds caused by sounds given from the speaker 2 can be controlled to a great extent and, at the same time, the quality of sounds, especially, in meddle- and high-tone ranges can be enhanced.

Figure 5:
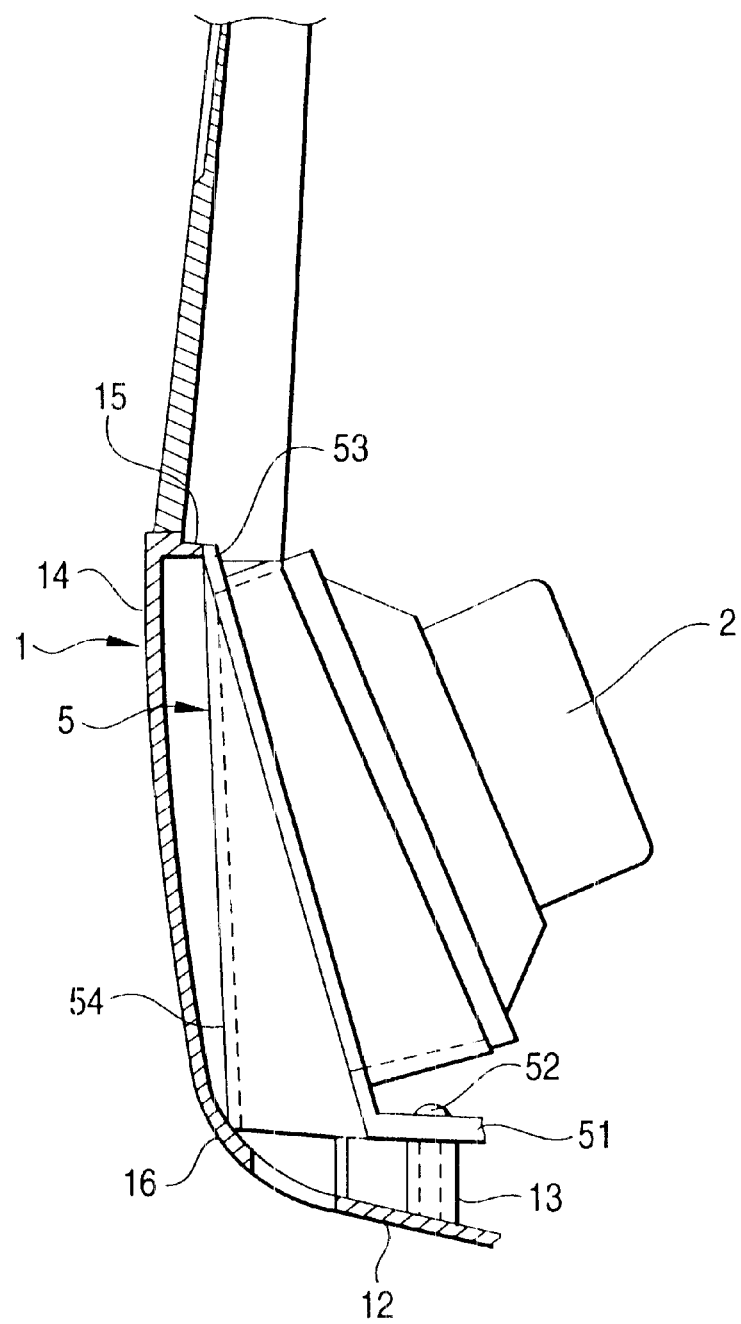

By the way, in FIGS. 1 to 5, like elements or equivalent elements to those described in FIG. 5 are respectively given the same designations.

As has been described heretofore, according to the invention, since the whole of the speaker holder holding a speaker thereon can be mounted in such a manner that it floats up from the cabinet, the sounds given from the speaker are prevented from being indistinct, the occurrence of the trembling sounds caused by sounds given from the speaker can be controlled greatly, and the quality of sounds, especially, in the middle- and high-tone ranges can be enhanced.

What is claimed is:

1. A speaker mounting structure, wherein
   a speaker holder holding a speaker thereon is fixed to a projecting portion provided on and projected from a cabinet of audio-visual equipment, said speaker holder comprising:
   a holder main body for holding said speaker thereon,
   a mounting portion provided on and projected from a portion of the periphery of said holder main body,
   a sound release opening formed in said holder main body being situated in a portion adjacent to said mounting portion, and
   a sound guide space included in said holder main body for guiding sounds given from said speaker to said sound release opening; and
   wherein said mounting portion is fixed to said projecting portion of said cabinet so that said holder main body extends in a cantilever manner from said fixing portion between said mounting portion thereof and said projecting portion of said cabinet so that the whole of said main body is disposed at a clearance with said cabinet.

2. The speaker mounting structure as set forth in claim 1, wherein
   said mounting portion of said holder main body is fixed to said projecting portion of said cabinet using a screw.

3. The speaker mounting structure as set forth in claim 1, wherein
   said projecting portion of said cabinet is disposed on the inner surface of the front wall of said cabinet, and
   said holder main body extends through a corner portion between said front wall of said cabinet and the peripheral wall of said cabinet formed continuously with said front wall.

4. The speaker mounting structure as set forth in claim 1, wherein
   said projecting portion of said cabinet is disposed on the inner surface of the front wall of said cabinet,
   said holder main body extends through a corner portion between said front wall of said cabinet and the peripheral wall of said cabinet formed continuously with said front wall, and
   said sound release opening is formed so as to face said corner portion of said cabinet.

* * * * *